United States Patent [19]

Kreuzer et al.

[11] Patent Number: 5,532,952
[45] Date of Patent: Jul. 2, 1996

[54] SELECTIVELY ALTERABLE OPTICAL DATA MEMORY

[75] Inventors: Markus Kreuzer, Darmstadt; Rudolf Eidenschink, Mainz, both of Germany

[73] Assignee: NEMATEL Dr, R. Eidenshink, Mainz, Germany

[21] Appl. No.: 307,847

[22] PCT Filed: Apr. 7, 1993

[86] PCT No.: PCT/EP93/00864

§ 371 Date: Dec. 12, 1994

§ 102(e) Date: Dec. 12, 1994

[87] PCT Pub. No.: WO93/20554

PCT Pub. Date: Oct. 14, 1993

[30] Foreign Application Priority Data

Apr. 7, 1992 [DE] Germany .................. 42 11 502.7

[51] Int. Cl.⁶ .................. G02F 1/13; C09K 3/34
[52] U.S. Cl. .................. 365/108; 359/102; 359/36; 359/45; 359/55; 359/90
[58] Field of Search .................. 365/108; 359/43, 359/59, 100, 103, 102, 36, 45, 55, 90

[56] References Cited

U.S. PATENT DOCUMENTS

| | | | |
|---|---|---|---|
| 3,832,033 | 8/1974 | Furuhata et al. | 360/160 LC |
| 3,947,375 | 3/1976 | Gray et al. | 359/43 |
| 3,957,344 | 5/1976 | Saeva | 350/150 |
| 3,957,345 | 5/1976 | Saeva | 350/150 |
| 4,035,056 | 7/1977 | Coates et al. | 359/103 |
| 4,196,974 | 4/1980 | Hareng et al. | 359/43 |
| 4,221,471 | 9/1980 | Gurtler | 350/331 R |
| 4,420,224 | 12/1983 | Kaufmann | 350/338 |
| 4,448,491 | 5/1984 | Okubo | 359/59 |
| 4,984,198 | 1/1991 | Kobayashi et al. | 365/108 |
| 5,039,208 | 8/1991 | Ohnishi et al. | 359/100 |

FOREIGN PATENT DOCUMENTS

| | | |
|---|---|---|
| 153729A1 | 9/1985 | European Pat. Off. . |
| 425321A2 | 5/1991 | European Pat. Off. . |
| 461619A2 | 12/1991 | European Pat. Off. . |
| 2319916 | 2/1977 | France . |
| 2645322 | 10/1990 | France . |
| 4041682A1 | 6/1992 | Germany . |
| 59-094733 | 5/1984 | Japan . |
| 59-094734 | 5/1984 | Japan . |
| 59-104625 | 6/1984 | Japan . |
| 60-59542 | 4/1985 | Japan . |
| 61-115251 | 6/1986 | Japan . |
| 63-144433 | 6/1988 | Japan . |
| 3-025736 | 2/1991 | Japan . |
| 2090673 | 7/1982 | United Kingdom . |
| 2138620 | 10/1984 | United Kingdom . |

*Primary Examiner*—Viet Q. Nguyen
*Attorney, Agent, or Firm*—Marshall, O'Toole, Gerstein, Murray & Borun

[57] ABSTRACT

A selectively alterable optical data memory (10) has a liquid crystal display (12) with a nematic medium (22), which consists of a nematic phase and a solid dispersed in it, a first voltage source (26), a second voltage source (30) and a modulable laser (32). With the first voltage source (26), the entire display can be converted into the homeotropic state by producing a forming voltage. With the laser (32), an orientation pattern can be produced in display 12 that can be erased or altered at least partially by the application of the threshold voltage and simultaneous irradiation with the laser (32).

8 Claims, 1 Drawing Sheet

SELECTIVELY ALTERABLE OPTICAL DATA MEMORY

DESCRIPTION

The invention is concerned with a method for changing the local orientation pattern in a selectively alterable data memory as well as with an optical data memory.

Bistable optical data memories, which are based on transitions between different liquid crystalline phases and different optical properties of textures are known (Bleha, Proc. Eurodisplay '90, p. 44). It is also known that such changes of the optical properties of smectic A phases can be brought about by laser irradiation with the aid of an electric field. These data memories have severe disadvantages. Thus, data memories which operate with smectic A phases must be temperature-controlled. In general, the turn-on time and the erasure time of information is too long for broad application. In addition, the contrast is insufficient when used as projection display.

Realization of different stable orientation states, without maintaining external fields, was successful so far with nematic liquid crystals only when a highly dispersed solid is incorporated (EP 91 117 274, DE 40 41 682). In this case, upon application of a voltage for a short time, a homeotropic, transparent layer is produced, in which permanent information, characterized by a randomly arranged light-scattering orientation pattern, is written by a laser beam. In addition, by an electrochemical reaction in the orientation layer of such a "twisted" nematic cell (Barberi et al., Proc. IEEE 1991, p. 186), it was possible to reach two stable orientation states. In addition, the bistability of various textures of the cholesteric phase, which is formed by doping of a nematic phase with optically active compounds, was successful with the aid of a polymeric network (D.-K. Yang et al. IEEE, 1991, p. 49). Switching back and forth between different stable molecular orientations in a nematic phase can be done in such displays by short-time application of voltages of different frequencies or by successive application of laser light and then voltage. Changing of an inscribed information is technically very complicated here. It can be achieved by separate electrical control of each information element in a pixel or by erasing the entire information that was inscribed previously with a laser beam by application of a voltage to the large-area electrodes.

The task of the invention is to find a simple optical device which permits a selective and rapid changing of information consisting of a multiplicity of local orientation patterns written in a nematic medium, with no separate electrical control being necessary for the area that is to be changed in the data memory.

This task is solved according to the invention by an optical data memory.

Surprisingly, it was found that a local orientation pattern can be changed selectively in a nematic medium that is located between two plates with inside electrodes and consists of a nematic phase and a solid dispersed in it, by application of an auxiliary electric voltage and simultaneous irradiation with electromagnetic energy of high intensity, for example, from a laser light source, and that this change is retained after completion of the irradiation and maintenance, turning off or alteration of the auxiliary voltage. This makes it possible to change information rapidly and selectively in a simple data memory that has few electrical contacts, in the simplest case, only two contacts, and one can utilize the high resolution that is to be achieved with a laser beam.

The liquid crystals that can be used for producing the liquid crystal medium according to the invention can be low-molecular or polymeric. Preferably, they are low-molecular. They may consist of individual compounds or of mixtures of nematogenic compounds. Such compounds are generally known (see D. Demus, H. Zaschke, Flüssige Kristalle in Tabelle [Liquid Crystals in Tables], Volume I (1974) and Volume II (1984), Leipzig). Preferred are compounds having general formula I

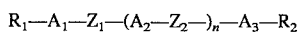

wherein $R_1$ and $R_2$, independently of one another, stand for an alkyl or alkenyl group with 1 to 15 carbon atoms, which can be unsubstituted or at least monosubstituted by halogen, and one or several $CH_2$ groups, always independently of one another, can be replaced by —O—, —CO—, —COO—, —OOC— or —OCOO— in such a way that the O atoms are not directly joined to one another, H, halogen, —CN, —CF$_3$, —OCHF$_2$, —OCF$_3$ or —NCS, $A_1$, $A_2$, $A_3$, in each case independently of one another, stand for a trans-1,4-cyclohexylene group, which can be unsubstituted or substituted with —CN or with at least one F atom, wherein one or several non-neighboring $CH_2$ groups can be replaced by —O— and/or —S—, a 1,4-phenylene group, which can be unsubstituted or substituted by —CN or by at least one halogen atom, wherein one or two CH groups can also be replaced by N, a 1,4-bicyclo[2.2.2]octylene group or a 1,3-bicyclo[1.1.1]pentylene group, $Z_1$, $Z_2$, in each case independently of one another, stand for —COO—, —OOC—, —CH$_2$O—, —OCH$_2$—, —CEC—, —CH=CH—, —CH$_2$CH$_2$— or a single bond, and n is 0, 1 or 2.

The cholesteric phase, which is formed by optically active compounds, is closely related to the nematic phase (see H. Kelker, R. Hatz, Handbook of Liquid Crystals, Verlag Chemie, Weinheim 1980). Within the scope of the invention, it is to be understood as a nematic phase.

Discoid nematic phases, which are formed by plate-shaped molecules, are also included in the invention.

It was shown that the difference in light transmittance necessary, for example, for the representation of images, and can be achieved in the electrooptic data memories according to the invention, depend insignificantly on the adaptation of the refractive indices of the nematic phase and of the solid dispersed in it. On the other hand, as in all displays that are based on the formation of liquid crystal partial volumes with different molecular orientation, for example, displays according to the known principle of dynamic scattering, a high value for the optical anisotropy An of the nematic phase is advantageous.

The dielectric anisotropy Δε of the nematic phases used may have a positive sign or negative sign. In the former case, the preferred direction of the molecules is parallel to the applied electric field, while in the latter, it is perpendicular to it. For keeping the operating voltage as low as possible, high values of Δε are advantageous.

The nematic phase used for producing the medium according to the invention may also contain dyes in the dissolved form for producing special color effects (see R. Eidenschink, Kontakte 1984 (2) 25). The addition of dyes for absorption and conversion of the laser light into thermal energy is also possible. Furthermore, conducting salts, in order to produce electrohydrodynamic effects, nonmesogenic compounds to lower the viscosity and antioxidants may be present in a dissolved form. In addition, low-molecular or polymeric compounds can be dissolved that will influence the interactions between the solid particles or between the solid and the nematic phase, for example, polydiethylene glycols.

The solid used consists of inorganic or organic material. Solids made of inorganic material are preferred. The solids can be dispersed in the nematic phase by mechanical distribution (such as stirring or ultrasound irradiation). In addition, the production of networks or particles made of organic material by polymerization of prepolymeric compounds dissolved or dispersed in the nematic phase are possible. Those solids are preferred which carry groups on their surface that can form hydrogen bonds. These are especially solids that carry —OH or —NH groups, for example, as molecular building blocks of polyamides. Especially preferred are those with —OH groups. Among the inorganic solids, mainly oxides and hydroxides of silicon, aluminum, zirconium, zinc, tin and titanium that are predominantly amorphous to x-rays, are preferred. Especially preferred are highly dispersed silicic acids, such as pyrogenic silicic acids consisting of aggregates and agglomerates of primary particles (2–90 nm diameter) (for example, Aerosils of Degussa AG, document series Pigments No. 11, 5th Edition and No. 56, 4th Edition) and precipitated silicic acids which are characterized by cavities (see company brochure Precipitated Silicic Acids and Silicates of the same manufacturer). Highly dispersed silicic acids which were made hydrophobic are especially suitable, especially the products R 974 and R 812 of Degussa AG, in which a part of the silanol groups are replaced by dimethylsilyl-, trimethylsilyl-, dimethylsiloxane groups and also by 3-methacryloxypropyl groups which are capable of producing crosslinking reactions.

Suitable solids also include especially thixotropic substances, which form agglomerates with one another via hydrogen bonds that can be separated and formed again easily. Aerogels, which are formed by evaporation of the solvent form a gelled body, can also be used as solid. In this case, the nematic phase is introduced by capillary forces with displacement of air.

Among organic materials, polyamides and polysaccharides are preferred.

The solids used in the invention are characterized by the fact that they have groups with active hydrogen atoms on their surfaces, that is, hydrogen atoms bonded to N, O or S in carboxyl, hydroxyl, amino, imino and thiol groups. The number of groups can be determined volumetrically quantitatively by treatment of the solid with Zeriwitinoff reagent or—as in the case of highly dispersed silicic acids—with lithium aluminum hydride. The surface of the solid is generally measured according to the well-known BET method.

The volume fraction of the solid in the volume of the nematic medium can be between 0.2 and 50 volume %, preferably it is between 2 and 5 volume %.

Otherwise, reference is made to EP 91 117 274 and DE 40 41 682, the full content of which is herewith made the object of the disclosure.

Furthermore, it was found that the interactions between the surface of the solid and the molecules that form the nematic phase influence the stability in time of an orientation pattern produced in the nematic phase. Those interactions were found to be especially favorable within the scope of the present inventions, which form between the above solids and nematogenic compounds, the molecules of which contain heteroatoms capable of forming hydrogen bonds, such as carbonitriles, ethers, esters and heterocycles.

The reason for the stability of the various orientation patterns can possibly be attributed to the fact that, as a result of a relatively strong interaction between the solid surface and the molecules in the nematic phase, forces that are produced in the latter by interaction from outside can be transferred to the solid. As a result of this, regions of the solid particles can be separated at the points where they are bound to one another only by hydrogen bonds. Formation of these bonds again, which is more favorable for the system energetically, at other points of the solid surface could thus lead to the observed locally stable orientation patterns because of the orienting effects from these bonds on the nematic phase. However, other explanations are also possible.

The orientation in the nematic medium is designated as homeotropic when the preferred direction of the molecular orientation, which is usually described by what is called a director (Vertogen, de Jeu, Thermotropic Liquid Crystals, Fundamentals, Springer Verlag 1988) lies perpendicularly to the plates of the device. A planar orientation is characterized by a director, that lies parallel to the plate surface. Local stable orientation patterns, with a uniform director, or those in which partial volumes have different directors can be produced in the nematic medium of the present invention, Within the present invention, local orientation patterns with a uniform director are considered to be predominantly planar when the director forms an angle of 0° to 45°, with respect to the plane of the plate and predominantly homeotropic when this angle ranges from about 45° to 90°.

The transparent plates of the electrooptic display elements according to the invention usually consist of glass and are provided on the inside with transparent electrodes and leads made of tin/indium oxides (ITO), according to the state of the art for TN cells. To produce a display, the liquid crystal medium can be applied in sufficient amount on the electrode side of a plate and then the second plate is pressed onto this in such a way that a layer is produced which is free from air bubbles. The distance between the plates, which is adjusted depending on the purpose of application, using the technique known to the expert as "hinged" technique, can be set by transparent spacers added to the medium or by edge layers applied onto the plates before introduction of the medium. The layer thickness which can be adjusted by the above techniques is very variable and preferably lies between 2 and 30 μm. The nematic medium can also be embedded into a polymeric material in the form of droplets.

It was observed that plates, the surfaces of which orient nematic phases that do not contain any solid, also have an influence on the molecular orientation in the nematic medium. Such treatments of the surfaces are generally known in display technology and can be carried out by application of a thin layer of a surface-active substance and/or rubbing in a preferred direction. This is especially favorable within the scope of the invention when the local orientation pattern is characterized by a planar or homeotropic orientation.

The voltage applied to the electrodes for the selective change process can be dc or ac voltage. Especially auxiliary voltages of different frequencies can be applied to produce different local orientation patterns. This applies especially when using the well-known nematic 2-frequency mixtures, for which $\Delta\epsilon>0$ applies below the crossover frequency and $\Delta\epsilon<0$ applies above it. The auxiliary voltages are below the forming voltage, which will be explained below, and, among others, depend on the nature and on the layer thickness of the nematic medium in which the solid is present. This auxiliary voltage, in the form of dc or ac voltage, is sufficient to produce a new local orientation pattern, as long as the selected region of the data memory is exposed to a strong electromagnetic radiation (for example, with a laser beam). The auxiliary voltage has a minimum value (here designated as threshold voltage), which is usually between 3 and 10 $V_{eff}$ and depends on the nature and layer thickness of the nematic medium and on the intensity of the electromagnetic radiation. Although the auxiliary voltage is applied to the entire memory, only those regions of the memory which were irradiated for a short time are converted into the state predetermined by the E field. As a result of this, selective new orientation of memory regions is possible, as described above.

In contrast to this, the entire memory can be converted into the homeotropic state with erasure of all the regions that were previously written on, as long as the forming voltage is applied to the electrodes of the memory, this voltage usually being between 50 and 250 $V_{eff}$, and as long as the $\Delta\epsilon$ of the nematic phase is <0. This forming voltage again depends on the nature and on the layer thickness of the medium and can be determined more closely if necessary.

Energy-rich electromagnetic beams, especially those which are focused, are used for writing data into the memory according to the invention. Laser light is preferred.

The wavelength of the irradiating electromagnetic radiation, which impinges on a region of the data memory during an erasure process which is defined within the invention as a change of the local orientation pattern, can vary within wide limits. Radiation lying in the infrared, visible and ultraviolet regions is suitable. Semiconductor laser sources that emit wavelengths of 650 to 900 nm are especially suitable. The minimum energy density of the electromagnetic radiation for the change lies at 0.01 to 10 nJ/$\mu m^2$, preferably 0.1 and especially 1 nJ/$\mu m^2$. The time within which the energy is irradiated into the surface element to be altered lies below 5 ms, preferably below 0.5 ms. At sufficiently high radiation powers, irradiation times even below 1 $\mu s$ can be achieved.

The irradiation produces rapid local heating. In most cases of application, this is not sufficient to heat the nematic medium above the conversion temperature to the isotropic phase. The extents of the orientation patterns produced in the nematic medium remain distinguishable from their surroundings, even optically when the temperature is lowered by contacting the memory with a cooling medium, and thus a transition is produced into the known smectic phases ($S_A$, $S_B$, $S_C$). Therefore, the invention includes those data memories which, in order to change a local orientation pattern, are exposed simultaneously to laser radiation and to electrical voltage in the region of existence of the nematic phase of a solid-containing nematic medium, but are read in the region of existence of a smectic phase.

The rate of the changing process can be increased for the same laser power when laser light is absorbed by a dye. The dye can be dissolved in the nematic phase, can be linked chemically to the solid, or can be applied in a thin layer on the inside or outside of a plate. In many cases, absorption of laser light by the ITO layer is sufficient. Possibly, as a result of the sudden thermal expansion, hydrogen bonds between the solid particles or regions within a solid body skeleton are broken.

The selection of the frequency and the magnitude of the voltage on the one hand and the intensity and direction of polarization of the laser light on the other hand make different local orientation patterns possible in the region irradiated by laser:

A Mainly homeotropic molecular orientation. This is formed in nematic media with $\Delta\epsilon>0$ at sufficiently high auxiliary voltages. In natural light, this region appears transparent.

B Random orientation in small volumes of the medium. This pattern is formed in all nematic media when the auxiliary voltage is turned off or at voltages below the threshold voltage. In natural light, this region appears strongly scattering.

C Planar molecular orientation, which is characterized by a preferential orientation of the longitudinal axes of the molecules parallel to the plane of the plate. Their direction within this plane is determined by the direction of rubbing on the pretreated plates and/or by the direction of vibration of the E field of the laser light. The development of the planar orientation is facilitated by application of electrical auxiliary voltage to the plate, when $\Delta\epsilon<0$.

The selection between more than two fundamentally different orientation patterns (A, B and C) in a point-like region of the data memory permits, in principle, an increased information density in the data memory if the reading device has suitable differentiating possibilities.

In the present invention, an optical data memory is defined as being selectively alterable when laser light and electrical voltage are applied simultaneously to produce at least one of the two participating stable orientation patterns.

The optical properties of the alterable local orientation patterns can be varied within wide limits. Thus, by selection of the voltage, intensity of the laser beam and pretreatment of the plate surface, the director can be adjusted into very different directions. The scattering state can be modified by the selection of the intensity of the laser, so that the directors in the partial volumes of the local orientation pattern are not directed in random directions, but have a preferential direction, as a result of which transmitted natural light is scattered less than in the case of random orientation. As a result of this, when reading the information, the representation of grayscale levels is possible.

The writing or alteration of information in the optical data memory can be carried out at constant electrical voltage or at an electrical voltage with modulated magnitude and frequency, and at constant laser light intensity or in laser light with modulated intensity and direction of polarization.

The achievable contrast of the optical data memory is 50 to 100 and thus it is significantly higher than the value of 10 given for bistable $S_A$ phases.

The local alterable orientation patterns on which the invention is based can be written point by point or continuously. In the optical data memories, these orientation patterns can be distinguished from their surroundings because of their optical properties—either by the intensity of light scattered from a laser beam, or by the change of the state of polarization of polarized light—and thus represent information. The optical properties of the local orientation pattern can be changed in steps by selection of both the duration and intensity of the laser radiation as well as by changing the applied voltage, so that different levels of a grayscale can be produced, for example, for use as projection display or for nonbinary data memories.

The optical data memory according to the invention can be used as display by making the change of the orientation pattern visible by illumination with a separate light source, which itself does not cause any change in the orientation pattern, for example, a white light source.

The following examples serve to explain the invention without representing a limitation. In the text above, and in the following, $\Delta n$ stands for optical anisotropy at 20° C., $\Delta\epsilon$ for dielectric anisotropy at 20° C., d for density in g/cm$^3$, $V_{eff}$ for effective voltage in volts, λ for wavelength of maximum absorption.

EXAMPLE 1

The drawing shows an example of a selectively alterable optical data memory.

The following are shown:

Figure 1:
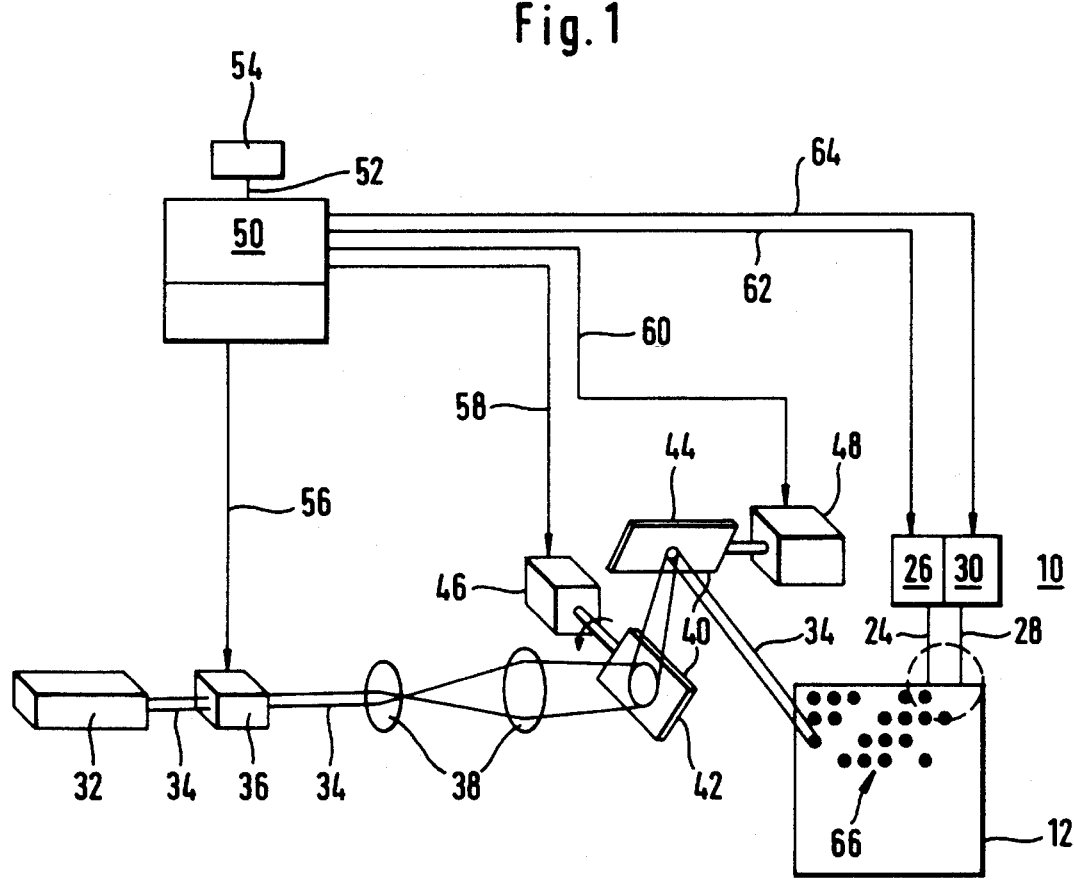
FIG. 1 is a schematic block diagram of the data memory.

In FIG. 1, 10 designates an optical data memory which can be written on and/or erased or altered selectively.

Figure 2:
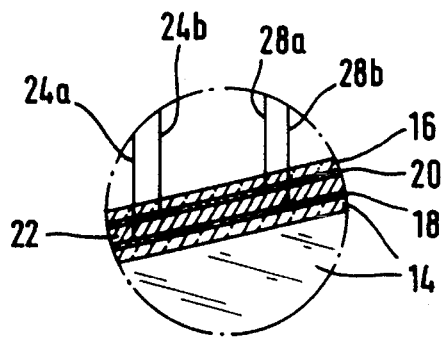
FIG. 2 is a section of the memory (see dotted circle in FIG. 1) in a perspective view from the top.

This data memory 10 has a liquid crystal display 12, which is explained in more detail in FIG. 2. It consists of two transparent plates 14 and 16, which are usually glass plates. Each of these plates 14 and 16 is coated on the inside with a transparent electrode—usually according to the ITO technique, as explained above. These electrodes are also transparent.

The nematic medium 22, which can be written on selectively or can be erased selectively is located between electrodes 18 and 20.

Through electrical conductors 24a and 24b, electrodes 18 and 20 are connected to a first voltage source 26 and through conductors 28a and 28b to a second voltage source 30.

Furthermore, the optical data memory 10 has a source for laser light 32, which produces a light beam 34. A modulation unit 36 is disposed in the path of the light beam 34 with which the light intensity can be modulated in order to adjust levels on the grayscale.

This is followed by a lens unit 38, with which the laser beam can be focused or imaged onto the nematic medium using a mirror system 40.

This mirror system 40 consists of a first mirror 42 and a second mirror 44, which can deflect the light beam 34 in the x or y direction. For this purpose, these mirrors 42 and 44 are each connected to a drive unit 46 and 48, which are able to turn the plane of the mirror around a predetermined angle.

Furthermore, a control unit 50 is provided, which is connected to an input unit 54 through an input cable 52. A first control cable 56 goes from the control unit; the modulation unit 36 is connected to this cable, a second control unit 58, with which the first drive unit 46 is connected, a third control cable 60, to which the second drive unit 48 is connected, a fourth control cable 62 with to the first voltage source 26 is connected and a fifth control cable 64 to which the second voltage source 30 is connected.

The control unit 50 gives its commands for activation or deactivation through control cable 56–64 and can be programmed correspondingly through input unit 54. Advantageously, the control unit 50 is designed in the form of a microprocessor.

Data memory 10 is operated as follows:

First of all, the first voltage source 26 is activated, which usually lies between 50 and 200 $V_{eff}$. Thus, this voltage source is designed as a forming voltage source, which converts all liquid crystal molecules into a predetermined preferred position, whereby the molecular planes are directed parallel to the direction of the field. Thus, all molecules are arranged parallel to the direction of the field so that when the memory 12 is irradiated with a light source, which is not shown, it appears to be transparent.

Now, in order to write a certain data pattern into the display 12, the laser source 32 is activated and the laser beam 34 that is produced is deflected onto the display 12 in the x and y direction using the mirrors 42 and 44, which had been adjusted in a predetermined manner by the drive units 46, 48 through the control unit 50. This leads to a pattern 66, which is shown for example, in memory 12. During activation of the laser light, both the voltage source 26 as well as the voltage source 30 remain in the nonactivated state.

Now, if a point of the pattern is to be altered without altering or erasing other points, the second voltage source 30 is activated by the control unit 50 through the control cable 64, and the second voltage is adjusted to a voltage which is significantly lower than the forming voltage. In this example, it is about 10–20 $V_{eff}$. The two mirrors 42 and 44 are adjusted onto the selected point. The laser source 32 produces an energy pulse through the modulator 36. As a result of this, the initially existing orientation is changed, presumably by breaking hydrogen bonds between solid particles or regions within the solid particle skeleton. When the second voltage source that gives off a voltage above the threshold voltage is active, the molecules of the nematic phase are oriented again in the electric field. Due to the interaction between these molecules and the solid particle surface, presumably the solid particles are also oriented anew. By forming hydrogen bonds, the solid is ordered again and thus it is fixed in the molecular orientation predetermined by the field. The initial orientation can be produced again by a sufficiently high voltage, but one which is significantly below the one given by 26. Since the local orientation pattern no longer scatters light in this state, the corrected point disappears from the pattern 66.

However, the voltage applied by the second voltage source is so small that the pattern itself or parts thereof cannot be altered without irradiation with a laser light source. If one wishes now to erase the entire pattern, this requires the elevated forming voltage, which is applied only through the first voltage source 26.

Otherwise, the cables 24a,b and 28a,b can be combined to a cable pair whereby the two voltage sources 26 and 30 are either combined or have a cable branch. The laser source 32 and the modulator 30 can also be replaced by a directly modulable light source, for example, a semiconductor laser.

EXAMPLE 2

In another embodiment of the selectively alterable data memory 10 according to the invention, the electrode 16, which is away from the laser beam 34, is a reflecting layer.

EXAMPLE 3

Another embodiment consists in that, for generation and changing the local orientation pattern, a device of disk-shaped plates is rotated under a light source and the beam is changed anew in a coordinate.

EXAMPLE 4

The dye SC 1515 of BASF, Ludwigshafen ($\lambda_{max}$=769 nm), 0.010 g is dissolved in 0.920 g of the nematic phase ZLI 1132 (E. Merck), consisting of several benzonitriles having formula I (d=0.98, Δn=0.14, Δε=+10.3). This new nematic phase and 0.080 g of the hydrophobic highly dispersed silicic acid R812 of Degussa AG (aggregates and agglomerates of primary particles having a diameter of 7 nm, density of —OH groups 0.44 per nm$^2$, d=2.2) are mixed intimately by mechanical agitation.

Some of this nematic medium, with a solid content of 3.7 volume %, is placed onto a glass plate coated with an indium/tin oxide layer, onto which previously cylinder-shaped spacers made of glass fibers with 2.5 μm diameter were scattered (about 10 spacers per cm$^2$). Then a similar plate is pressed onto this. By careful back and forth movement, it is ensured that a distance of 2.5 μm is reached. After scraping off the excess nematic medium, the plates are fixed in a frame and each of two exposed electrode surfaces is provided with an electrical contact.

With the voltage applied (500 Hz, sinusoidal, 15 $V_{eff}$), this data memory is provided with local orientation patterns which are characterized by a predominantly homeotropic molecular orientation, using a beam from a semiconductor laser source (output 9 mW, beam diameter 50 μm, wavelength 780 nm, irradiation time 0.3 ms) through a computer-controlled mirror system with a tight point sequence or continuously. In this way, the entire surface of the data memory is oriented homeotropically and is ready for the input of information. A similar initial state can be achieved by brief application of a voltage of 100 $V_{eff}$ (sinusoidal, 500 Hz). Information consisting of many local orientation patterns, which are characterized by a random, highly light-scattering molecular orientation, is written onto this surface with the above laser (power 12 mW, otherwise the same data) without applied voltage. This stable information is altered selectively by the fact that, with voltage applied (15 $V_{eff}$), individual regions of light-scattering local orientation patterns are converted into predominantly homeotropically oriented regions by short irradiation with a laser (12 mW power, otherwise as above), and that these homeotropic regions are retained after the voltage is turned off. The processes of writing and alteration can be repeated an arbitrary number of times.

EXAMPLE 5

A device produced in the manner shown in Example 1 contains a nematic medium consisting of the nematic ester mixture ZLI 2461 (E. Merck) with a Δε of +2.0 at 400 Hz and a Δε of −1.9 at 20 kHz and of precipitated silicic acid FK 310 (Degussa AG) with a silanol group density on the surface of approximately 6 per nm$^2$ and a BET surface area of 650 m$^2$/g dispersed in it, the content of the solid being 2.0 volume %. The distance of the electrodes is 14 μm. The inside of the each plate is coated with a thin orientation layer of a polyimide with parallel rubbing direction (see Sage in Thermotropic Liquid Crystals, John Wiley & Sons, 1987, p. 76). By brief application of a voltage of 250 $V_{eff}$ (400 Hz) the entire device is converted into a transparent state characterized by homeotropic orientation. Then, information is written on this with an Ar laser (λ 514 nm, 1 MW/cm$^2$) with an applied voltage of 70 $V_{eff}$ (20 kHz) consisting of many points (2 to 25 μm diameter); this information is retained after discontinuation of the laser irradiation and turning off of the voltage and is characterized by a predominantly planar molecular orientation parallel to the direction of rubbing. These planar local orientation patterns are converted into one with a predominantly homeotropic orientation with an applied voltage of 30 $V_{eff}$ (400 Hz) by a similar laser irradiation, without the optical properties of the non-irradiated areas of the device being changed significantly. Selective alteration from planar to homeotropic and vice versa from homeotropic to planar orientation can be repeated an arbitrary number of times.

We claim:

1. Selectively alterable optical data memory, having two plates, at least one of which is transparent, and which carry electrodes on internal surfaces thereof, a nematic medium between the plates comprising a nematic phase and a solid body dispersed in it, consisting essentially of highly-dispersed silicic acid, as well as a voltage source with which a voltage can be applied to the electrodes wherein the voltage source, when it is turned on, produces an auxiliary voltage which, by itself, cannot change the predetermined local orientation pattern of the data memory, and wherein a source of intense electromagnetic radiation is provided, which, when auxiliary voltage is applied, converts a predetermined local orientation pattern in the predetermined region of the data memory into another pattern.

2. Optical data memory according to claim 1 wherein the solid body dispersed in the nematic phase comprises highly-dispersed hydrophobic silicic acid.

3. Optical data memory according to claim 1 wherein the voltage source gives off an auxiliary voltage of 3 to 10 $V_{eff}$.

4. Optical data memory according to claim 1 wherein the source of electromagnetic radiation is a laser light source.

5. Optical data memory according to claim 1 wherein a device is provided which deflects the electromagnetic radiation onto a predetermined region of the data memory.

6. Optical data memory according to claim 1 wherein the change of the local orientation pattern in the nematic phase is related to transition from a random light-scattering orientation into a homeotropic one.

7. Optical data memory according to claim 1 wherein the change of the local orientation pattern in the nematic phase is related to transition from a homeotropic orientation to a planar orientation.

8. Optical data memory according to claim 1 wherein the change of the local orientation pattern in the nematic phase is related to a transition from a random light-scattering orientation to a planar one.

* * * * *